United States Patent
Wünsche et al.

(10) Patent No.: US 11,949,084 B2
(45) Date of Patent: Apr. 2, 2024

(54) BATTERY PACK COMPRISING FRAME PROFILE HAVING INTEGRAL REFRIGERANT CIRCUIT MEMBER

(71) Applicant: Samsung SDI Co., Ltd., Yongin-si (KR)

(72) Inventors: Ralph Wünsche, Graz (AT); Rainer Retter, Unterfladnitz (AT); Miran Kojc, Graz (AT); Thomas Hoermann, Graz (AT); Matthias Pucher, Graz (AT); Mario Marcovic, Pirching am Traubenberg (AT); Volker Matl, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 509 days.

(21) Appl. No.: 17/050,339

(22) PCT Filed: Mar. 8, 2019

(86) PCT No.: PCT/KR2019/002726
§ 371 (c)(1),
(2) Date: Oct. 23, 2020

(87) PCT Pub. No.: WO2019/221376
PCT Pub. Date: Nov. 21, 2019

(65) Prior Publication Data
US 2021/0119282 A1    Apr. 22, 2021

(30) Foreign Application Priority Data

May 16, 2018   (EP) .................................. 18172518
Jul. 23, 2018   (EP) .................................. 18184956
Mar. 7, 2019   (KR) ....................... 10-2019-0026496

(51) Int. Cl.
H01M 10/6568   (2014.01)
H01M 10/613    (2014.01)
(Continued)

(52) U.S. Cl.
CPC ..... H01M 10/6568 (2015.04); H01M 10/613 (2015.04); H01M 10/625 (2015.04);
(Continued)

(58) Field of Classification Search
CPC .......... H01M 10/6568; H01M 10/613; H01M 10/6556; H01M 10/653; H01M 10/6567; H01M 10/6557; H01M 10/655
See application file for complete search history.

(56) References Cited

U.S. PATENT DOCUMENTS 8,435,664 B2    5/2013 Saito et al.
2007/0087266 A1    4/2007 Bourke et al.
(Continued)

FOREIGN PATENT DOCUMENTS

CN    105247729 A    1/2016
CN    107528020 A    12/2017
(Continued)

OTHER PUBLICATIONS

Japanese Notice of Reasons for Refusal for Patent Application No. 2020-548642, dated Sep. 16, 2021, 22 pages.
(Continued)

*Primary Examiner* — Pamela H Weiss
*Assistant Examiner* — Amanda Rosenbaum
(74) *Attorney, Agent, or Firm* — Lewis Roca Rothgerber Christie LLP

(57) ABSTRACT

The present invention relates to a battery pack including a frame profile with integral coolant circuit elements. The battery pack includes one or more battery modules, each comprising a plurality of secondary battery cells, a frame-
(Continued)

work comprising a first frame profile and a second frame profile opposite to the first frame profile, and a liquid cooling circuit comprising one or more cooling plates being in thermal contact with the battery module.

15 Claims, 19 Drawing Sheets

(51) Int. Cl.
    *H01M 10/625*      (2014.01)
    *H01M 10/6554*     (2014.01)
    *H01M 10/6556*     (2014.01)
    *H01M 10/6567*     (2014.01)
    *H01M 50/207*      (2021.01)
    *H01M 50/209*      (2021.01)
    *H01M 50/244*      (2021.01)
    *H01M 50/249*      (2021.01)

(52) U.S. Cl.
    CPC ... *H01M 10/6554* (2015.04); *H01M 10/6556* (2015.04); *H01M 50/207* (2021.01); *H01M 50/209* (2021.01); *H01M 50/244* (2021.01); *H01M 50/249* (2021.01); *H01M 2220/20* (2013.01)

(56) References Cited

U.S. PATENT DOCUMENTS

| | | | |
|---|---|---|---|
| 2011/0206948 A1 | 8/2011 | Asai et al. | |
| 2011/0212355 A1* | 9/2011 | Essinger | H01M 10/6555 429/120 |
| 2012/0009457 A1 | 1/2012 | Lee et al. | |
| 2012/0177960 A1 | 7/2012 | Tasai et al. | |
| 2012/0315529 A1 | 12/2012 | Jin | |
| 2013/0095359 A1* | 4/2013 | Yoshioka | H01M 50/209 429/99 |
| 2013/0164576 A1 | 6/2013 | Cha et al. | |
| 2013/0309543 A1 | 11/2013 | Kim et al. | |
| 2014/0178736 A1 | 6/2014 | Gandhi et al. | |
| 2016/0006006 A1 | 1/2016 | Motokawa et al. | |
| 2016/0111761 A1 | 4/2016 | Kopra et al. | |
| 2016/0133999 A1 | 5/2016 | Lee et al. | |
| 2016/0211559 A1* | 7/2016 | Frohnmayer | H01M 10/6556 |
| 2017/0047624 A1* | 2/2017 | Gunna | H01M 10/6556 |
| 2017/0104252 A1 | 4/2017 | Wünsche et al. | |
| 2017/0110773 A1 | 4/2017 | Pucher | |
| 2017/0365887 A1 | 12/2017 | Kwon et al. | |
| 2018/0013110 A1 | 1/2018 | Wuensche et al. | |
| 2018/0026243 A1 | 1/2018 | Stojanovic et al. | |
| 2018/0040537 A1 | 2/2018 | Grassmann et al. | |
| 2018/0154754 A1* | 6/2018 | Rowley | B60K 1/04 |
| 2019/0296294 A1 | 9/2019 | Hirschbeck et al. | |
| 2020/0062130 A1 | 2/2020 | Wuensche et al. | |
| 2021/0143497 A1* | 5/2021 | Günther | H01M 10/625 |

FOREIGN PATENT DOCUMENTS

| | | |
|---|---|---|
| CN | 107680945 A | 2/2018 |
| EP | 3 154 103 A1 | 4/2017 |
| EP | 3 273 500 A1 | 1/2018 |
| EP | 3 331 055 A1 | 6/2018 |
| EP | 3 346 517 A1 | 7/2018 |
| JP | 2011-175743 A | 9/2011 |
| JP | 2011-198688 A | 10/2011 |
| JP | 2012-138205 A | 7/2012 |
| JP | 2015069845 A | 4/2015 |
| JP | 2016091951 A | 5/2016 |
| KR | 10-1112442 B1 | 2/2012 |
| KR | 10-2012-0096409 A | 8/2012 |
| KR | 10-2013-0005756 A | 1/2013 |
| KR | 10-1261736 B1 | 5/2013 |
| KR | 10-2014-0144781 A | 12/2014 |
| KR | 1020140144787 A | 12/2014 |
| KR | 10-1688484 B1 | 12/2016 |
| KR | 10-2017-0044006 A | 4/2017 |
| KR | 10-1736886 B1 | 5/2017 |
| KR | 10-2017-0142442 A | 12/2017 |
| KR | 10-2018-0006257 A | 1/2018 |
| KR | 10-2018-0010989 | 1/2018 |
| KR | 10-2018-0015097 A | 2/2018 |
| KR | 10-2017-0014924 A | 12/2019 |

OTHER PUBLICATIONS

European Office action issued in corresponding application No. 18 184 956.3, dated Feb. 3, 2023, 4 pages.
Korean Office action issued in corresponding application No. KR 10-2022-0079898, dated Nov. 25, 2023, 19 pages with English Translation.
Korean Notice of Allowance issued in corresponding application No. KR 10-2022-0079898, dated Mar. 27, 2023, 5 pages with English Translation.
EP Office action issued in EP 18184956.3 dated Dec. 11, 2020, 4 pages.
Extended European Search Report issued in EP 18184956.3, dated Jan. 9, 2019, 6 pages.
Chinese Notification of the First Office Action, issued in corresponding Patent Application No. 201980032821.4, dated Nov. 8, 2023, 18 w/English translation pages.

* cited by examiner

BATTERY PACK COMPRISING FRAME PROFILE HAVING INTEGRAL REFRIGERANT CIRCUIT MEMBER

CROSS-REFERENCE TO RELATED APPLICATIONS

This application is a National Phase Patent Application and claims priority to and the benefit of International Patent Application Number PCT/KR2019/002726, filed on Mar. 8, 2019, which claims priority to European Patent Application No. 18172518.5, filed on May 16, 2018, European Patent Application No. 18184956.3, filed on Jul. 23, 2018, and Korean Patent Application No. 10-2019-0026496, filed on Mar. 7, 2019, the entire contents of all of which are incorporated herein by reference.

TECHNICAL FIELD

The present invention relates to a battery pack for a vehicle, more specifically to a battery pack comprising a frame profile with integral coolant circuit elements. The invention further refers to a vehicle including the battery pack.

BACKGROUND ART

In the recent years, vehicles for transportation of goods and peoples have been developed using electric power as a source for motion. Such an electric vehicle is an automobile that is propelled by an electric motor, using energy stored in rechargeable batteries. An electric vehicle may be solely powered by batteries or may be a form of hybrid vehicle powered by for example a gasoline generator. Furthermore, the vehicle may include a combination of electric motor and conventional combustion engine. In general, an electric-vehicle battery (EVB) or traction battery is a battery used to power the propulsion of battery electric vehicles (BEVs). Electric-vehicle batteries differ from starting, lighting, and ignition batteries because they are designed to give power over sustained periods of time. A rechargeable or secondary battery differs from a primary battery in that it can be repeatedly charged and discharged, while the latter provides only an irreversible conversion of chemical to electrical energy. Low-capacity rechargeable batteries are used as power supply for small electronic devices, such as cellular phones, notebook computers and camcorders, while high-capacity rechargeable batteries are used as the power supply for hybrid vehicles and the like.

In general, rechargeable batteries include an electrode assembly including a positive electrode, a negative electrode, and a separator interposed between the positive and negative electrodes, a case receiving the electrode assembly, and an electrode terminal electrically connected to the electrode assembly. An electrolyte solution is injected into the case in order to enable charging and discharging of the battery via an electrochemical reaction of the positive electrode, the negative electrode, and the electrolyte solution. The shape of the case, e.g. cylindrical or rectangular, depends on the battery's intended purpose. Lithium-ion (and similar lithium polymer) batteries, widely known via their use in laptops and consumer electronics, dominate the most recent group of electric vehicles in development. Rechargeable batteries may be used as a battery module formed of a plurality of unit battery cells coupled in series and/or in parallel so as to provide a high energy density, in particular for motor driving of a hybrid vehicle. That is, the battery module is formed by interconnecting the electrode terminals of the plurality of unit battery cells depending on a required amount of power and in order to realize a high-power rechargeable battery.

A battery pack is a set of any number of (preferably identical) battery modules. They may be configured in a series, parallel or a mixture of both to deliver the desired voltage, capacity, or power density. Components of battery packs include the individual battery modules, and the interconnects, which provide electrical conductivity between them. A battery management system (BMS) is provided for managing the battery pack, such as by protecting the battery from operating outside its safe operating area, monitoring its state, calculating secondary data, reporting that data, controlling its environment, authenticating it and/or balancing it.

The mechanical integration of such a battery pack requires appropriate mechanical connections between the individual components, e.g. of battery modules, and between them and a supporting structure of the vehicle. These connections must remain functional and save during the average service life of the battery system. Further, installation space and interchangeability requirements must be met, especially in mobile applications.

Mechanical integration of battery modules can be achieved by providing a carrier framework and by positioning the battery modules thereon. Fixing the battery cells or battery modules may be achieved by fitted depressions in the framework or by mechanical interconnectors such as bolts or screws. Alternatively, the battery modules are confined by fastening side plates to lateral sides of the carrier framework. Further, cover plates may be fixed atop and below the battery modules.

The carrier framework of the battery pack is mounted to a carrying structure of the vehicle. In case the battery pack shall be fixed at the bottom of the vehicle, the mechanical connection may be established from the bottom side by for example bolts passing through the carrier framework of the battery pack. The framework is usually made of aluminum or an aluminum alloy to lower the total weight of the construction. Battery systems according to the prior art, despite any modular structure, usually comprise a battery housing that serves as enclosure to seal the battery system against the environment and provides structural protection of the battery system's components. Housed battery systems are usually mounted as a whole into their application environment, e.g. an electric vehicle.

To provide thermal control of the battery pack a thermal management system is required to safely use the at least one battery module by efficiently emitting, discharging and/or dissipating heat generated from its rechargeable batteries. If the heat emission/discharge/dissipation is not sufficiently performed, temperature deviations occur between respective battery cells, such that the at least one battery module cannot generate a desired amount of power. In addition, an increase of the internal temperature can lead to abnormal reactions occurring therein and thus charging and discharging performance of the rechargeable deteriorates and the life-span of the rechargeable battery is shortened. Thus, cell cooling for effectively emitting/discharging/dissipating heat from the cells is required.

Therefore, the thermal management system may include a liquid cooling circuit. In general, the liquid cooling circuit may include several components, like cooling plates being in thermal contact with the battery modules, pipes or hoses for forwarding the liquid coolant, and coupling elements for connecting the pipes or hoses with the cooling plates, respectively a vehicles cooling circuit. Thus, conventional battery system cooling circuits comprise a huge number of single parts which is an impact in terms of cost and reliability. In particular, automatization of the manufacturing process may be impeded and replacement of defect system parts, e.g. a defect battery module, may also require dismounting several parts of the battery system cooling circuit. Therefore, such replacement procedure proves burdensome.

DISCLOSURE

Technical Problem

It is thus an object of the present invention to overcome or reduce at least some of the drawbacks of the prior art and to provide a battery pack, where the assembly effort and the number of parts can be reduced.

Technical Solution

One or more of the drawbacks of the prior art could be avoided or at least reduced by means of the present invention. A battery pack for a vehicle according to the present invention including one or more battery modules, each including a plurality of secondary battery cells, a framework including a first frame profile and a second frame profile opposite to the first frame profile, and a liquid cooling circuit including one or more cooling plates being in thermal contact with the battery module.

Each of the first and second frame profiles includes an integral coolant structure, which is part of the liquid cooling circuit.

In alternative to or in addition to the above mentioned cooling plates, the battery module includes a pair of module side plates and a pair of module front plates constituting a module frame for assembling the plurality of battery cells, wherein at least one of the module side plates includes an integral coolant structure, which is part of the liquid cooling circuit. In other words, a cooling media may be distributed through the cooling plates and/or the module side plates.

The inventive battery pack includes a metal framework for supporting the battery module. The metal framework is of rectangular shape and two sides thereof, which face each other, are realized by frame profiles to ensure structural integrity of the battery pack. The battery pack further involves a liquid cooling circuit which may be coupled to a vehicle cooling circuit. The liquid cooling circuit of the battery pack includes one or more cooling plates, respectively module side plates, which are in thermal contact with the battery module, i.e. are able to cool or heat the modules if necessary. In particular, the cooling plate may form (in parts or in total) a ground floor of the battery pack and the battery module is mounted thereon.

An important aspect of the present invention is to integrate parts of the battery cooling circuit into the frame profile of the framework. More specifically, a cooling circuit of the battery pack shall include means for distributing the liquid coolant to the cooling plates and/or module side plates respectively receiving the liquid coolant from the cooling plates and/or module side plates. According to the present invention, each of the frame profiles comprises an integral coolant (distribution/collection) structure. That means, a rigid frame profile involves integrated hollows used as coolant channels and being designed to distribute the liquid coolant to or collect the liquid coolant from the cooling plate. In other words, parts of the cooling circuit and parts of the framework are integrated into common components.

In particular, said common components are the two frame profiles including the integral coolant structure. Here, integral is understood as being of one-piece or being directly integrated into the frame profile instead of being mounted or attached to the frame profile. Hence, the integral cooling structure and the other parts of the frame profile are for example not separable from each other. The inventive part of the integrated cooling circuit provides outstanding robustness without increasing the total weight of the battery pack. Furthermore, the manufacturing process is highly simplified since the number of component parts is significantly reduced.

The integral coolant structure includes a first channel for passage of coolant, the first channel extending in longitudinal direction of the frame profile, and one or more connection points being in fluid communication with the first channel and respective connection points of the cooling plate and/or module side plate.

According to the aforementioned embodiment the coolant structure may be simply established within the frame profile by defining a coolant channel following the longitudinal extension of the frame profile, for example running in parallel to a lower side of the frame profile. In predefined positions at the outer surface of the frame profile connection points are provided for coupling to respective connection points of the cooling plate and/or module side plate. Thus, the coolant distribution/collection structure may directly adjoin the cooling plates and/or module side plate besides a gasket, which may be placed between the connection points of both components.

The integral coolant distribution structure may include one or more connection points for a vehicle coolant circuit at a narrow side of the frame profile. The preferred position of the inlet/outlet connection points ensures easy access during the mounting process of the battery pack into a vehicle.

According to a first embodiment, the integral coolant distribution structure of the first and/or second frame profile further includes a second channel for passage of coolant, the second channel extending in longitudinal direction of the frame profile and being in fluid communication with the first channel via a constituent section. Thus, the second channel basically extends parallel to the first channel, but is not directly in fluid communication with the connection points to the cooling plate and/or module side plate. Providing a second channel thus allows adopting the point of inflow of the coolant into the first channel, respectively the point of outflow of the coolant from the first channel into the second channel. Thereby, the overall cooling of all battery modules may be optimized.

The constituent section is positioned at or in a range up to 10 cm from a geometrical mean of the positions of the connection points in longitudinal extension of the frame profile. If the coolant inflow into the first channel is in a central region, the coolant temperature within all relevant parts of the battery pack will be more equal thus avoiding overheating of single battery modules due to inefficient cooling.

According to a second embodiment which is an alternative to the before mentioned first embodiment, the integral coolant distribution structure of each of the first and second frame profile includes a first channel for passage of coolant, the first channel extending in longitudinal direction of the frame profile; one or more connection points being in fluid communication with the first channel and respective connection points of the cooling plate and/or module side plate; a second channel for passage of coolant, the second channel extending in longitudinal direction of the frame profile and not being in fluid communication with the first channel; and one or more connection points being in fluid communication with the second channel and respective connection points of the cooling plate and/or module side plate.

Thus, the second embodiment may be used to independently establish two coolant flows through the cooling plates in opposite directions. Thereby, cooling will be more equal in all relevant parts of the battery pack and overheating of single battery modules may be avoided.

According to another preferred design option, the one or more connection points of the first and second channel are arranged at a lower side of the frame profile; and the one or more respective connection points of the cooling plate are arranged at an upper side of the cooling plate.

Generally, the battery pack will be mounted to a supporting structure of a vehicle. Depending on the construction method of the vehicle, the vehicle body can be for example a vehicle frame, a self-supporting body or a space frame type vehicle body. The vehicle body is constructed from vehicle body parts and is configured for load accommodation (power intake) during normal operation and in crash situations. Usually, the battery pack will be fixed to the bottom of the vehicles supporting structure. i.e. the upper side of the frame profiles will face the vehicles supporting structure. The inventive concept of providing the connection points at the lower side of the frame profile has the advantage that in case of defects the cooling plate could be easily demounted and, for example single battery modules may be replaced without demounting the whole battery pack. Preferably, an arrester element is provided at the lower side of the frame profile and the cooling plate are resting against the arrester element when the cooling plate and the integral coolant distribution structure of the frame profiles are in fluid communication. Thereby, a correct position of the corresponding connection points of the frame profile and the cooling plate could be always ensured.

The first and second frame profiles are preferably made of (extruded) aluminum or an aluminum alloy. Extruded aluminum or aluminum alloy (or sheath) shows sufficient thermal conductivity and mechanical characteristics. Furthermore, aluminum is a low weight material and manufacturing costs are low. Thus, the integrated coolant structure and all other parts of the frame profile are made of the very same material.

The battery module may include a pair of module side plates and a pair of module front plates constituting a module frame for assembling the plurality of battery cells, wherein at least one of the module side plates comprises an integral coolant structure, which is part of the liquid cooling circuit. Thus, the side plates of the module frame do also include an integral structure adapted for distribution of the cooling fluid and being connected to the liquid cooling circuit. Cooling of the battery cell from not only the bottom side improves significantly the temperature distribution during electrical performance. The liquid cooling circuit of the vehicle may for example be subdivided in a first part including the above mentioned cooling plates and a second part including the module side plates. In case the cooling plates are damaged by mechanical impact and leakage of the cooling fluid occurs, there would be still a separate cooling by means of the module side plates.

The integral coolant structure of the module side plate includes a first channel for passage of coolant, the first channel extending in longitudinal direction of the module side plate; and connection points being in fluid communication with respective connection points of the integral cooling structure of the first and second frame profile.

According to the aforementioned embodiment the coolant structure may be simply established within the side plate by defining a coolant channel following the longitudinal extension of the side plate, for example running in parallel to a lower side of the side plate. In predefined positions at both narrow side surfaces of the side plate connection points are provided for coupling to respective connection points of the frame profiles. Thus, the coolant distribution/collection structure may directly adjoin the side frames besides a gasket, which may be placed between the connection points of both components.

The integral coolant structure of the module side plate may further include a second channel for passage of coolant, the second channel extending in longitudinal direction of the module side plate; and connection points being in fluid communication with respective connection points of the integral cooling structure of the first and second frame profile.

Thus, the second channel basically extends parallel to the first channel of the module side plate, but need not to be directly in fluid communication with the same. In particular, the first channel of the module side plate may be in fluid communication with the first channel of the first and second frame profile and the second channel of the module side plate may be in fluid communication with the second channel of the first and second frame profile. The liquid cooling circuit of the vehicle may for example be subdivided in a first part including the first channels of the module side plates and a second part including the second channels of the module side plates. In case that one of these parts is damaged by mechanical impact and leakage of the cooling fluid occurs, there would be still a separate cooling by means of the remaining part.

The module side plate may be made of the same material as the first and second frame profiles.

According to another aspect of the present invention, a vehicle including the battery pack as defined above is provided. The battery pack may be coupled to the vehicles cooling circuit at a connection point provided on a narrow side of the frame profiles as already described above.

Further aspects of the present invention could be learned from the dependent claims or the following description.

Advantageous Effects

A battery pack of the present invention can reduce the assembly effort and the number of parts.

BRIEF DESCRIPTION OF THE DRAWINGS

Features will become apparent to those of ordinary skill in the art by describing in detail exemplary embodiments with reference to the attached drawings in which.

MODE FOR INVENTION

Figure 1:
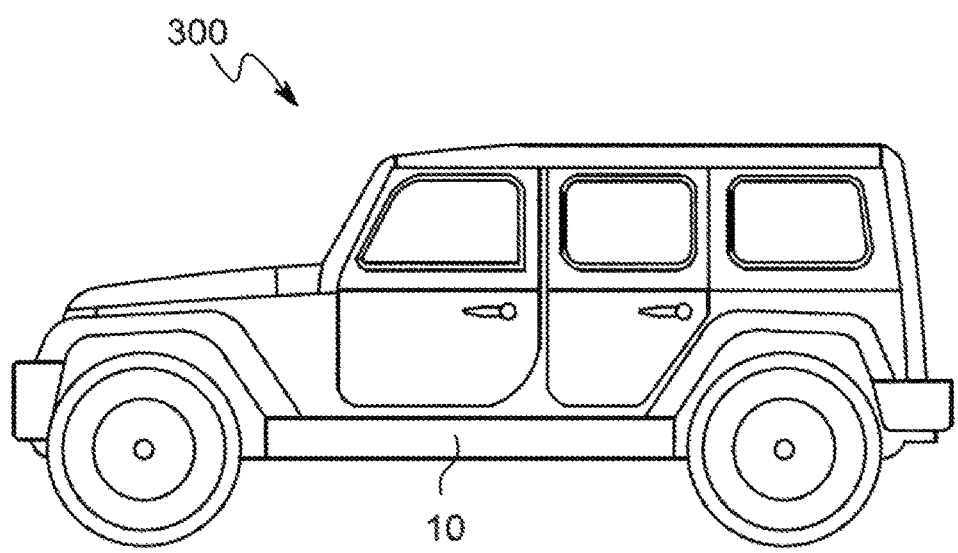
FIG. 1 schematic view on a vehicle including a battery pack.

Reference will now be made in detail to embodiments, examples of which are illustrated in the accompanying drawings. Effects and features of the exemplary embodiments, and implementation methods thereof will be described with reference to the accompanying drawings. In the drawings, like reference numerals denote like elements, and redundant descriptions are omitted. As used herein, the term "and/or" includes any and all combinations of one or more of the associated listed items. Further, the use of "may" when describing embodiments of the present invention refers to "one or more embodiments of the present invention."

Herein, the terms "upper" and "lower" are defined according to the z-axis. For example, the upper side is positioned at the upper part of the z-axis, whereas the lower side is positioned at the lower part thereof. In the drawings, the sizes of elements may be exaggerated for clarity. For example, in the drawings, the size or thickness of each element may be arbitrarily shown for illustrative purposes, and thus the embodiments of the present invention should not be construed as being limited thereto.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention.

Battery packs of electric or hybrid vehicles demand huge space and are therefore usually positioned at the lower side of the vehicle bodies. In particular, the battery pack may be fixed to a floor of a vehicle carrying structure. Battery packs according to the prior art, despite any modular structure, usually comprise a battery housing that serves as enclosure to seal the battery pack against the environment and provides structural protection of the battery pack's components. Housed battery packs are usually mounted as a whole into their application environment, e.g. an electric vehicle. In alternative, the battery pack may be configured for being structurally integrated in the vehicle carrying structure and may comprise attachment means that are configured to be connected to the vehicle body for structural integration. In other words, the vehicle body part may comprise the battery system carrier and may be directly integrated into the vehicle body instead of being mounted or attached to the vehicle body. The present invention could be realized in any of the before mentioned variants. FIG. 1 illustrates in a schematically way a vehicle 300 including a battery pack 10 mounted to the ground of a carrying structure of the vehicle 300.

Figure 2:
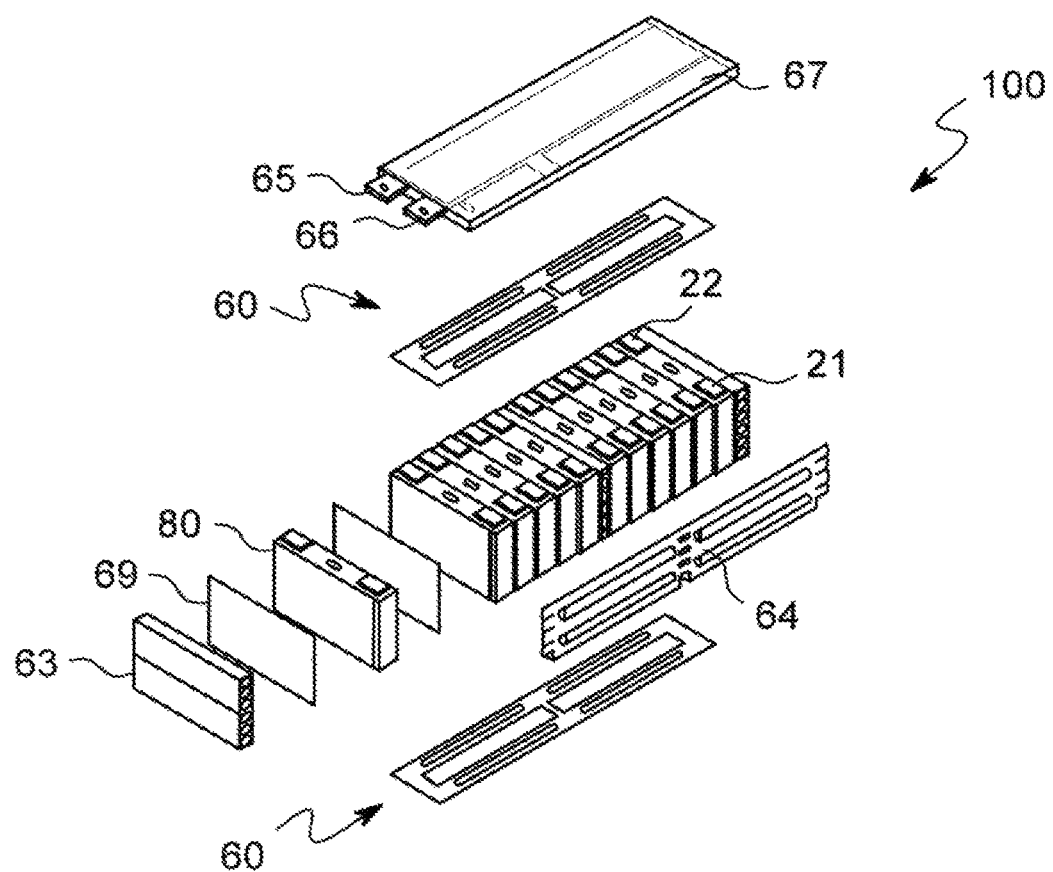
FIG. 2 illustrates a schematic exploded view of a conventional battery module.

FIG. 2 is a schematic exploded view of on a conventional battery module 100. The inventive battery pack 10 may include one or more such battery modules 100. Referring to FIG. 2, a plurality of aligned battery cells 80 with substantially planar shape is stacked together with their terminals 21, 22 facing upwards. In order to avoid any unwanted electric contact between individual battery cells 80 isolation foils 69 are disposed between adjacent battery cells 80. A pair of module front plates 63 is provided at both ends of the stack. The module front plates 63 are mechanically coupled to a pair of module side plates 64 facing the plurality of narrow lateral side walls of the battery cells 80. Further, a pair of module top and bottom plates 60 is connected to the module front plates 63 and the module side plates 64. The module front plates 63, the module side plates 64 and the module top and bottom plates 60 constitute a module frame for assembling the plurality of aligned battery cells 80, i.e. for providing mechanical integrity to the battery module 100. As further shown in FIG. 2, the battery cells 80 are electrically connected using a cell connection unit 67 (CCU) as electrical interconnector. The cell connection unit 67 comprises negative and positive module terminals 65, 66 and a plurality of conducting elements (not shown) respectively connected to positive and negative terminals 21, 22 of secondary battery cells 80.

Figure 3:
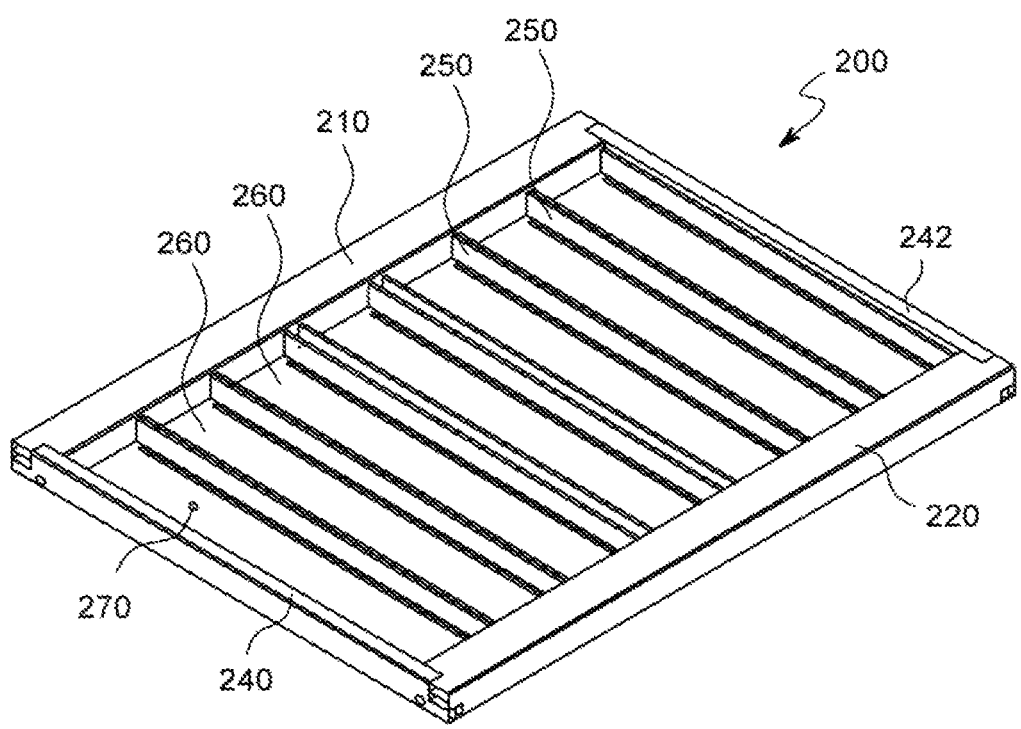
FIG. 3 illustrates a perspective view on a framework for accommodation of a plurality of battery modules according to an embodiment of the present invention.

FIG. 3 illustrates a perspective view on a metal framework 200 for accommodation and supporting of a plurality of battery modules 100 according to an embodiment of the present invention. The framework 200 includes a first frame profile 210 and a second frame profile 220. The first frame profile 210 and the second frame profile 220 are being positioned at longitudinal sides of the rectangular framework 200. Another pair of frame profiles 240, 242 connects the first and second frame profile 210, 220 at the narrow side of the framework 200. Furthermore, a number of crossbars 250 subdivides the interior space encompassed by the frame profiles 210, 220, 240, 242 into seven sections 260. Each of these sections 260 may accommodate up to eight battery modules 100 (not shown). According to the illustrated embodiment, at least the first frame profile 210 and the second frame profile 220 are made of extruded aluminum. Preferably, also the frame profiles 240, 242 and the crossbars 250 are made of the same material.

Generally, the battery cells 80 generate a large amount of heat while being charged/discharged. The generated heat is accumulated in the battery cells 80, thereby accelerating the deterioration of thereof. Therefore, the battery pack 10 further includes a liquid coolant circuit. Among others, the liquid cooling circuit of the battery pack 10 includes cooling plates 270 being in thermal contact with the battery modules 100. Specifically, there are provided seven cooling plates 270 at the bottom side of the framework 200, i.e. each cooling plate 270 acts as the same time as a supporting floor of a respective section 260. The cooling plates 270 may be made of a metal material, for example the same extruded aluminum as used for manufacturing the frame profiles 210, 220, 240, 242 and crossbars 250. Within the interior of the cooling plates 270 a passage for the liquid coolant is provided.

Figure 4:
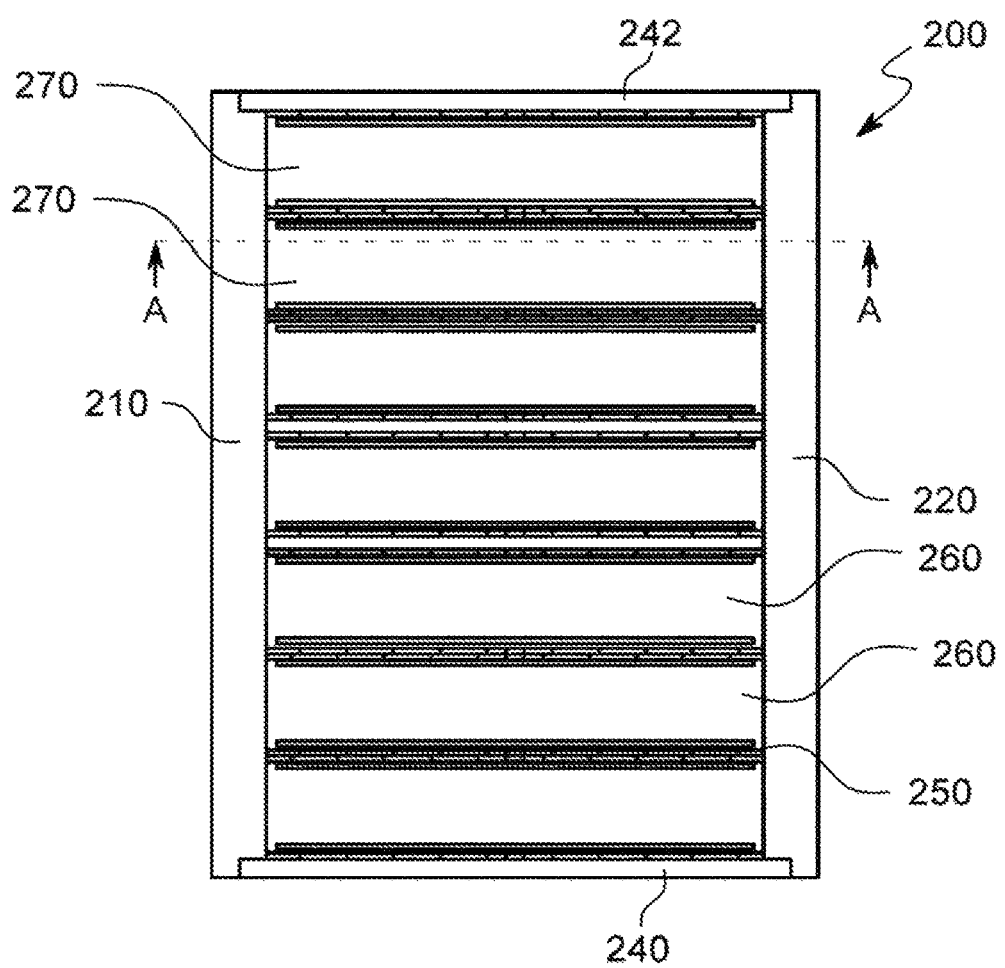
FIG. 4 illustrates a frontal view on the framework of FIG. 3.
Figure 5:
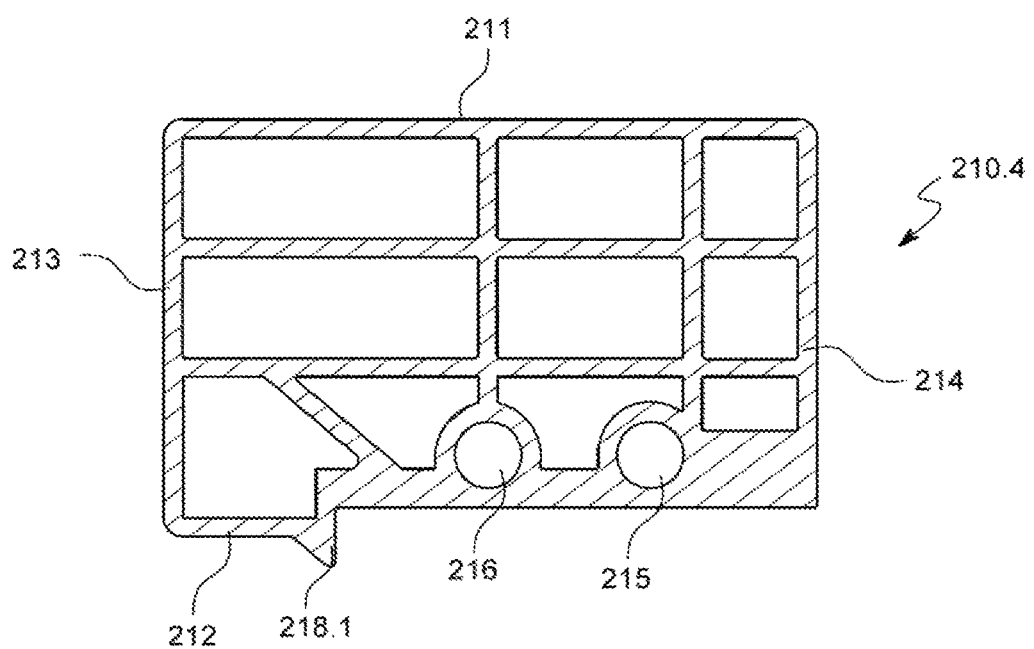
FIG. 5 illustrates a cross-sectional view along line A-A shown in FIG. 4 through the first frame profile.
Figure 6:
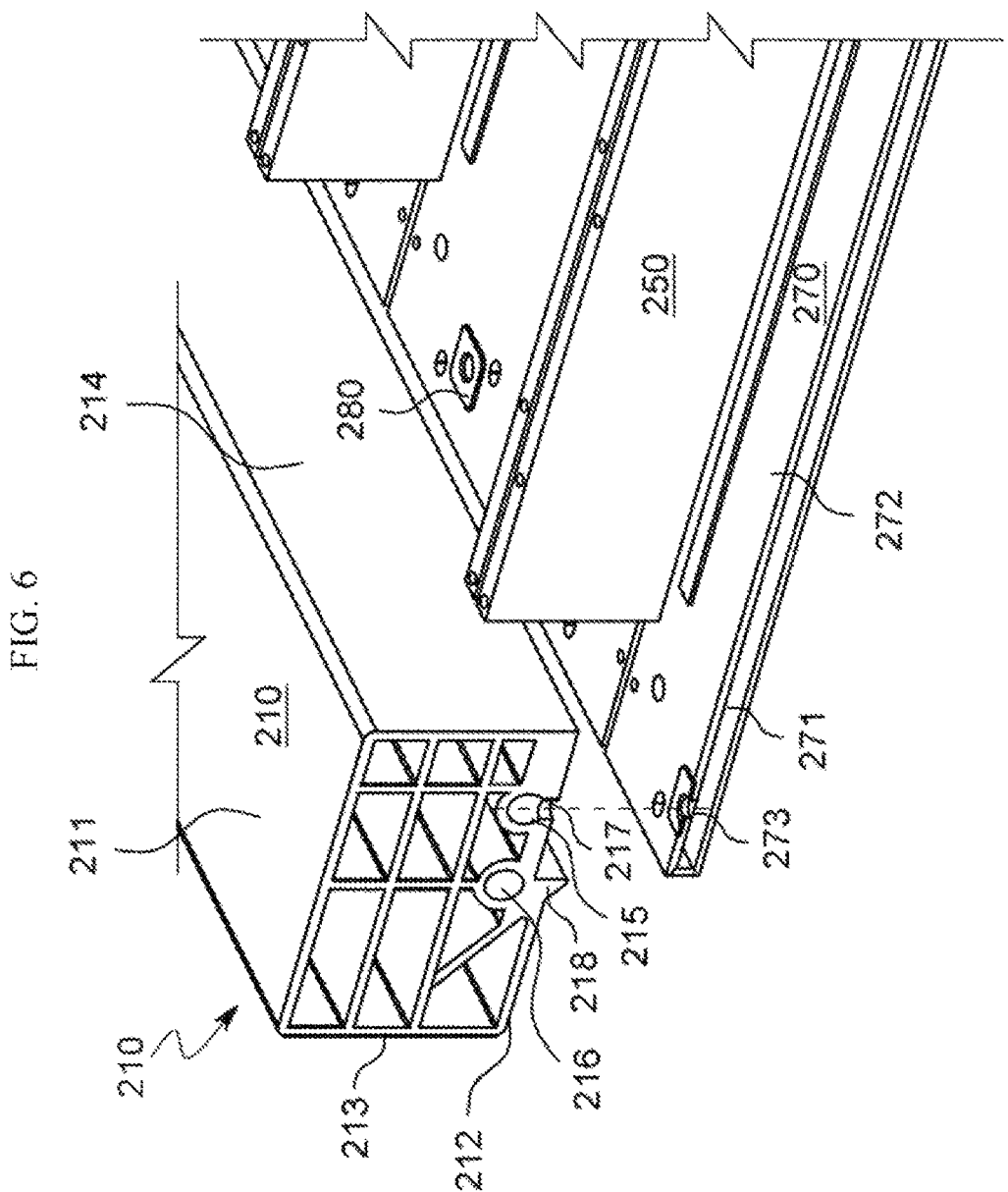
FIG. 6 is an exploded perspective view along the same line A-A of FIG. 4.

FIG. 5 illustrates a cross-sectional view along line A-A shown in FIG. 4, but restricted to the first frame profile 210. FIG. 6 is an exploded perspective view along the same line A-A illustrating in addition a part of the cooling plate 270. The first frame profile 210 shows a basically prismatic shape including an upper side 211 facing the vehicle body structure in final assembly, a lower side 212 facing the cooling plates 270 (shown in FIG. 6), and a pair of longitudinal sides 213, 214. According to the illustrated embodiment, the first frame profile 210 includes a first channel 215 and a second channel 216 both being arranged closed to the lower side 212 and extending parallel in longitudinal direction of the frame profile 210. More specifically, the second channel 216 is arranged in a central section of the lower side 212, whereas the first channel 215 is arranged much closer to the longitudinal side 214 facing to the interior space of the framework 200. The first channel 215 is in fluid communication with a connection point 217. According to the illustrated embodiment, fluid communication is achieved by a vertical drillhole extending from the lower side 212 into the first channel 215. The first channel 215, the second channel 216, and the connection point 217 are elements of an integral coolant structure, which is part of the liquid cooling circuit of the battery pack 10.

Furthermore, an arrester element 218 is provided at the lower side 212 of the first frame profile 210. Here, the arrester element 218 extends longitudinal in a central part of the first frame profile 210, i.e. beneath the second channel 216. As illustrated in FIG. 6, the cooling plates 270 are resting against the arrester element 218 when the cooling plates 270 and the integral coolant structure of the first frame profile 210 is in fluid communication.

As shown, the coolant structure is fully embedded into the first frame profile 210 and thus forms an integral part thereof. In other words, all constructive elements shown in the cross-sectional view of FIGS. 5 and 6 are made of one single piece of extruded aluminum and especially the parts of the coolant structure are not mounted as single elements to the frame profile 210.

As further illustrated in the cross-sectional view of FIG. 6, the cooling plate 270 comprises a passage 271 for a cooling liquid. On an upper side 272 of the cooling plate 270 there is provided a connection point 273 which corresponds in size and position with the connection point 217 of the frame profile 210. Tightness of the fluid connection of the cooling plate 270 and the frame profile 210 is ensured by a gasket 280 provided between the corresponding connection points 217 and 273.

The second frame profile 220 may have the very same structure as the first frame profile 210, i.e. includes a similar integral coolant structure. Therefore, the cooling plates 270 will also have respective connection points on the side facing the second frame profile 220. In other words, the integral coolant structure of the second frame profile will also include a first channel for passage of coolant extending in longitudinal direction of the second frame profile 220 and connection points being in fluid communication with said first channel and respective connection points of the cooling plates 270.

FIGS. 7 through 10 are schematic views for illustrating a coolant flow according to four exemplary embodiments.

Figure 7:
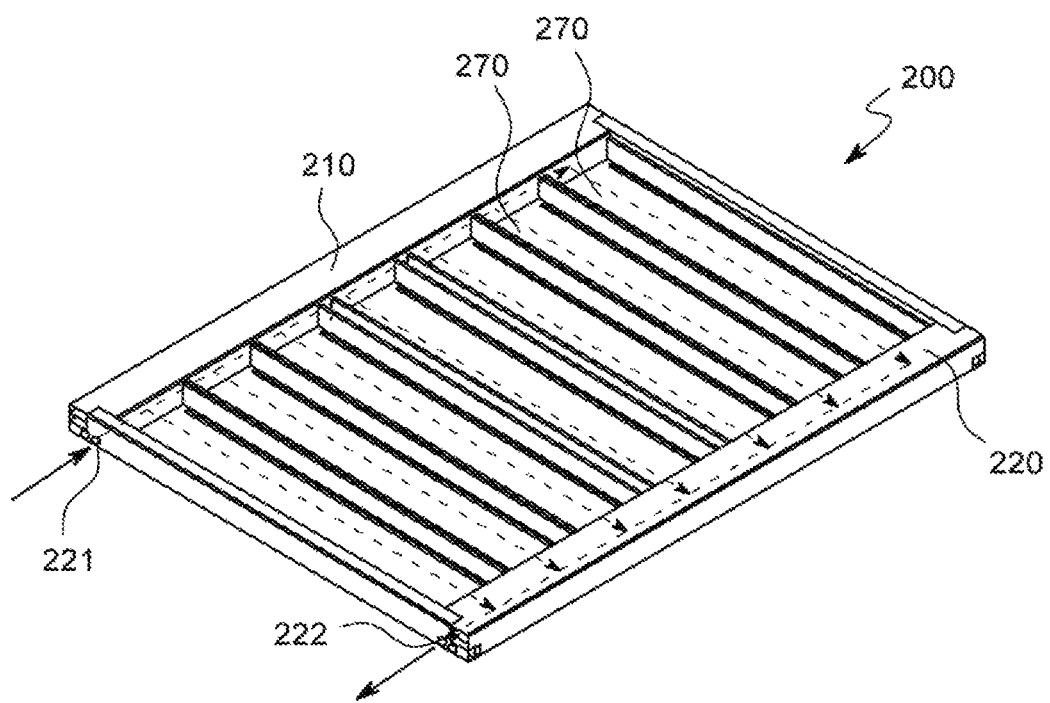
FIG. 7 is a schematic view on a coolant flow according to a first exemplary embodiment.

In detail, the framework 200 of FIG. 7 is the same as described above with respect to FIGS. 3 through 6. The integral coolant distribution structure of the first frame profile 210 includes a connection point 221 for a vehicle coolant circuit (not shown) at a narrow side of the first frame profile 210. Also the second frame profile 220 includes such a connection point 222 being arranged on the same side of the framework 200 as the connection point 221 of the first frame profile 210. The connection point 221 represents an inlet where a liquid coolant is feed into the coolant circuit of the battery pack 10, whereas connection point 222 is the outlet thereof. The dotted lines shall demonstrate the coolant flow through the frame profiles 210, 220 and the cooling plates 270.

According to the illustrated first embodiment, the connection point 221 is in direct fluid communication with the first channel 215 and the connection point 222 is in direct fluid communication in a similar way with a first channel being embedded in the second frame profile 220. Therefore, the coolant is distributed by the integral coolant structure of the first frame profile 210 into the seven cooling plates 270 and after passing the cooling plates 270 collected by the integral coolant structure of the second frame profile 220.

Figure 8:
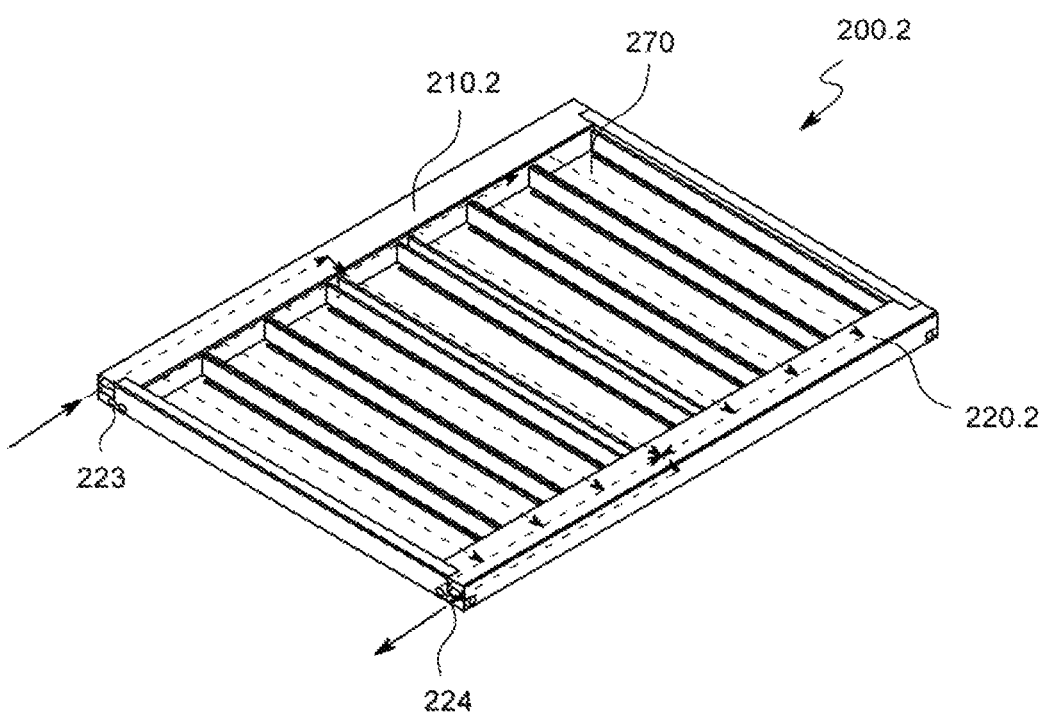
FIG. 8 is a schematic view on a coolant flow according to a second exemplary embodiment.

A second exemplary embodiment of coolant flow is illustrated in FIG. 8. The second exemplary embodiment basically equals the first exemplary embodiment of FIG. 7. However, a connection point 223 is used as a coolant inlet at the first frame profile 210.2, which is in direct fluid communication with the second channel 216. Further, a connection point 224, which is in direct fluid communication with a second channel of the second frame profile 220.2, is used as outlet for the liquid coolant. The second channel 216 of the first frame profile 210.2 is in fluid communication with the first channel 215 via a constituent section (not visible but indicated by the coolant flow). Said constituent section is positioned at or in a range up to 10 cm from a geometrical mean of the positions of the connection points 217 in longitudinal extension of both frame profiles 210.2, 220.2. Thereby, the coolant temperature distribution with respect to the longitudinal extension of the framework 200.2 may be more equal compared to the embodiment illustrated in FIG. 7.

Figure 9:
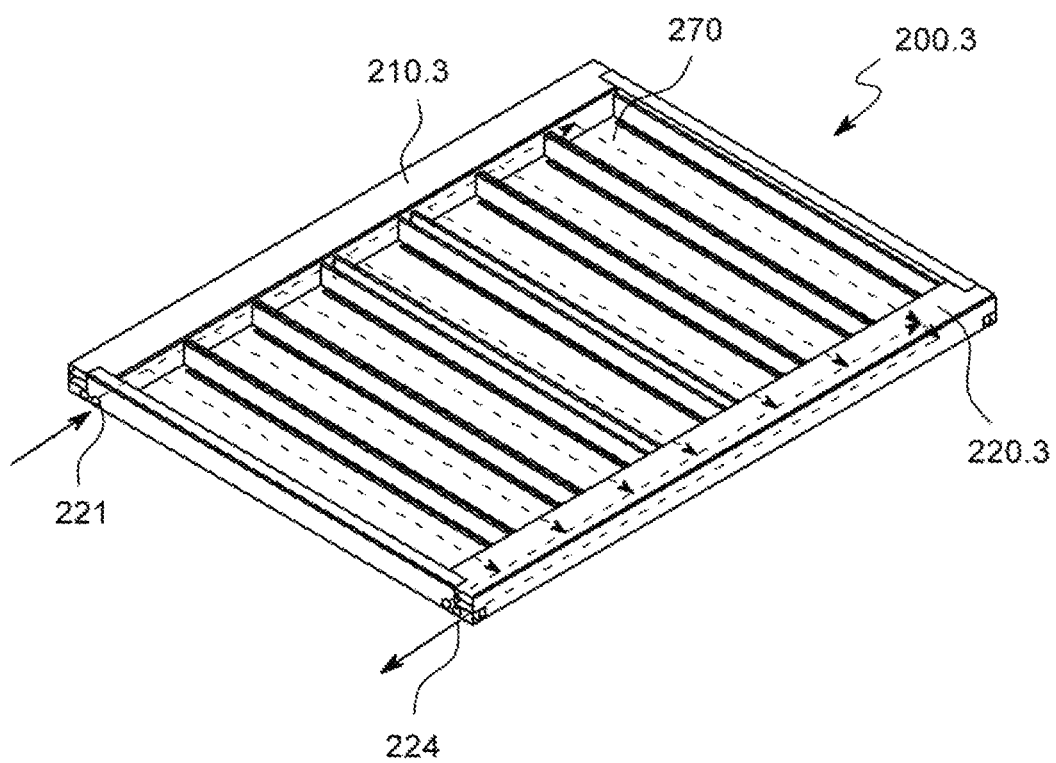
FIG. 9 is a schematic view on a coolant flow according to a third exemplary embodiment.

A third exemplary embodiment of coolant flow is illustrated in FIG. 9. The third exemplary embodiment basically equals the first exemplary embodiment of FIG. 7. The coolant is directly introduced via connection point 221 into the first channel 215 of the first frame profile 210.3, passes the cooling plates 270 and is afterwards collected by the first channel of the second frame profile 220.3. However, the first channel of the second frame profile 220.3 is in fluid communication with the second channel via a constituent section being arranged at the longitudinal side of the framework 200.3 which is opposite to the connection point 221. Connection point 224, which is in fluid communication with the second channel, represents the coolant outlet of the cooling circuit of the battery pack 10.

Figure 10:
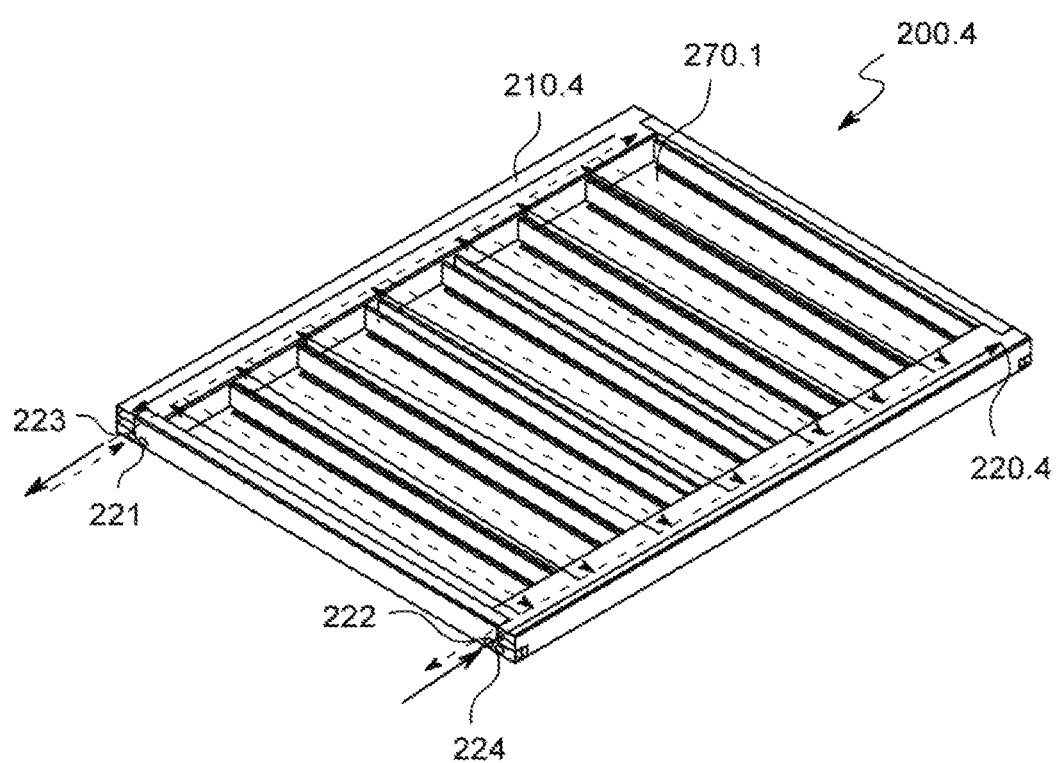
FIG. 10 is a schematic view on a coolant flow according to a fourth exemplary embodiment.

A fourth exemplary embodiment of coolant flow is illustrated in FIG. 10. Here, the integral coolant structure of the first frame profile 210.4 and second frame profile 220.4 includes, a first channel for passage of coolant, the first channel extending in longitudinal direction of the frame profile, connection points 221, 222 being in fluid communication with the first channel and respective connection points of the cooling plates 270.1, a second channel for passage of coolant, the second channel extending in longitudinal direction of the frame profiles 210.4, 220.4 and not being in fluid communication with the first channel, and connection points 223, 224 being in fluid communication with the second channel and respective connection points of the cooling plates 270.1.

The fourth embodiment departs from all other embodiments described above in that there are two independent coolant circuits within the battery pack 10, which may be driven in opposite direction (coolant flows indicated by dotted lines and continuous lines). Thereby, the coolant temperature may be more equal in each region of the framework 200.4. Furthermore, even in case of leakage of one of the cooling circuits, the remaining cooling circuit may still prevent overheating of the battery pack.

Figure 11:
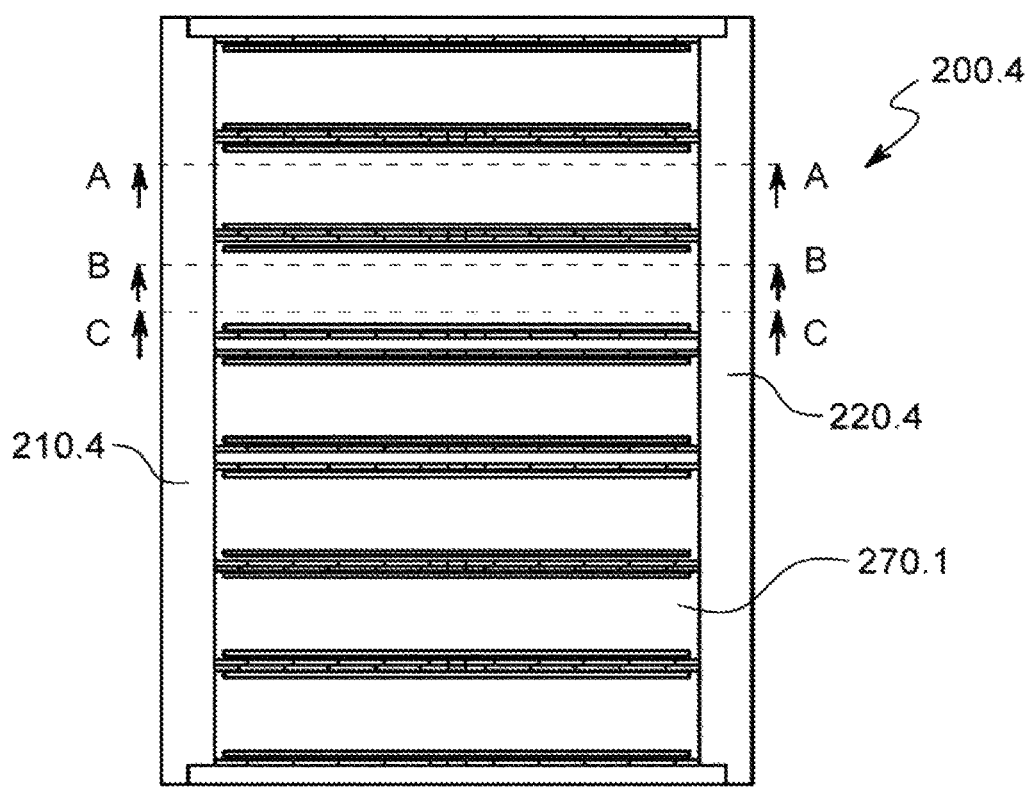
FIG. 11 illustrates a top view on the framework of FIG. 10.
Figure 12:
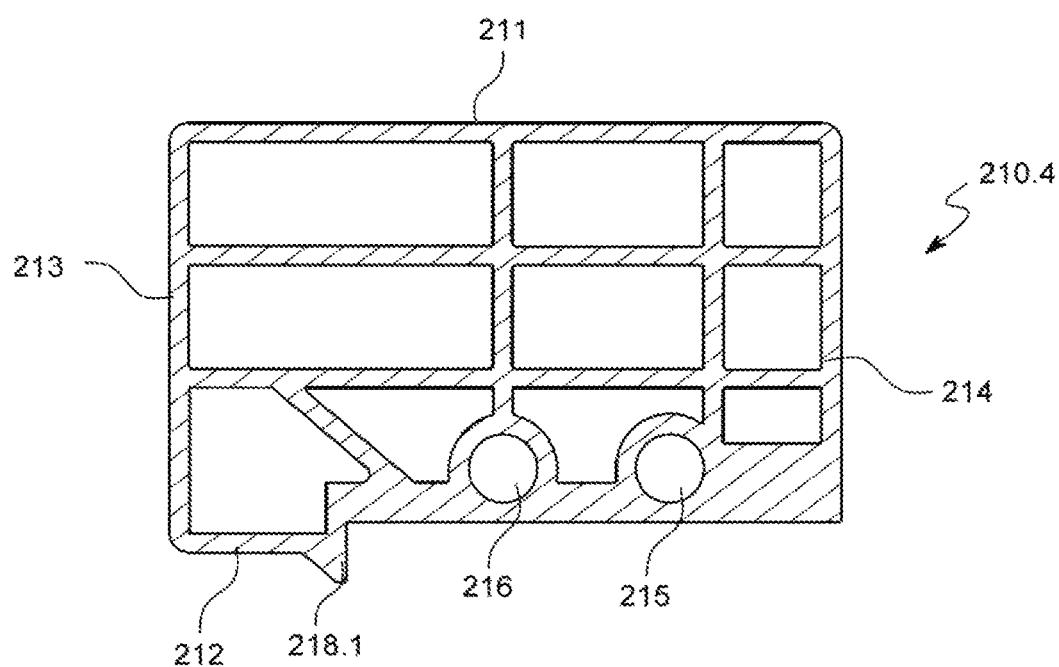
FIG. 12 illustrates a cross-sectional view along line A-A shown in FIG. 11 through the first frame profile.
Figure 13:
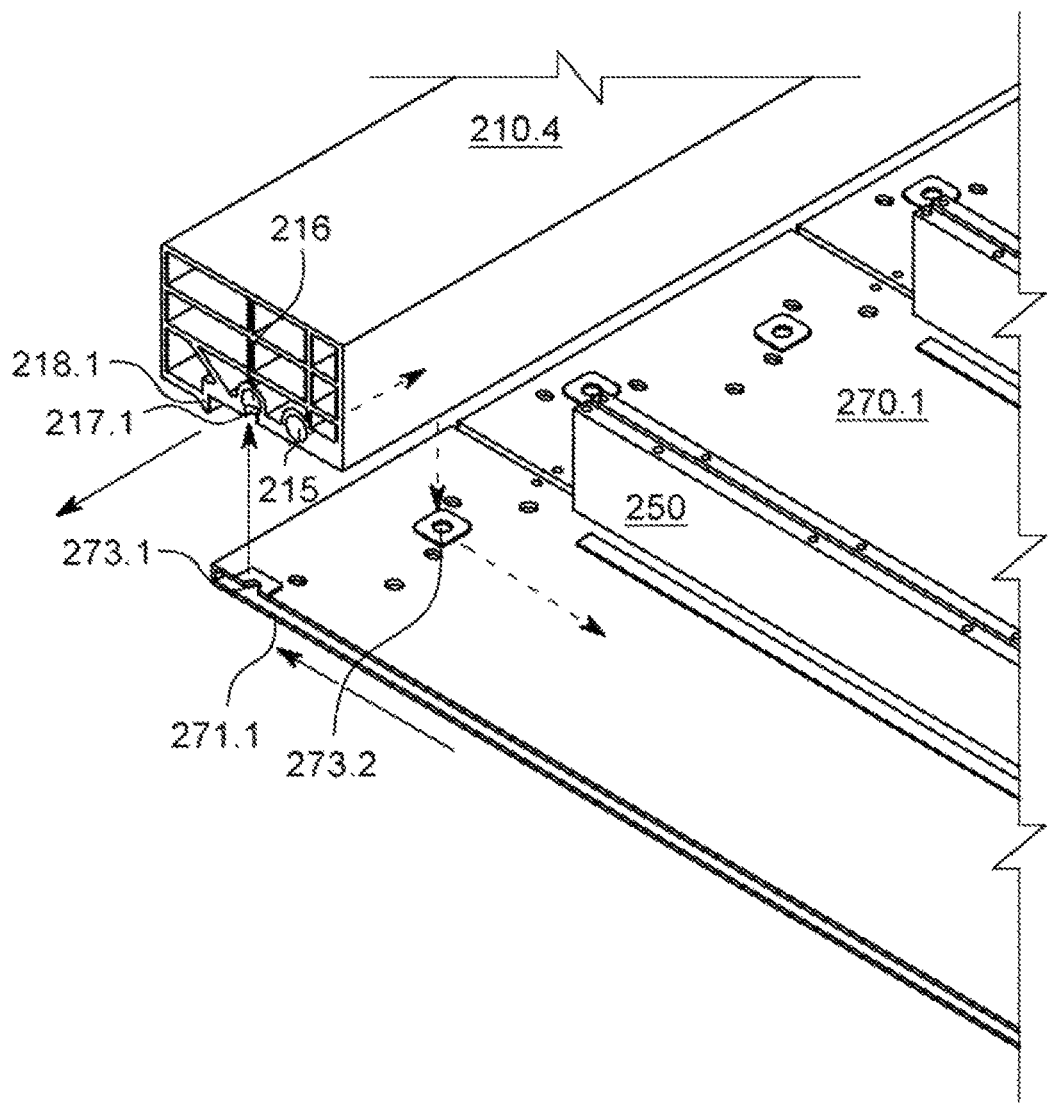
FIG. 13 illustrates an exploded perspective view along line C-C shown in FIG. 11 through the first frame profile.
Figure 14:
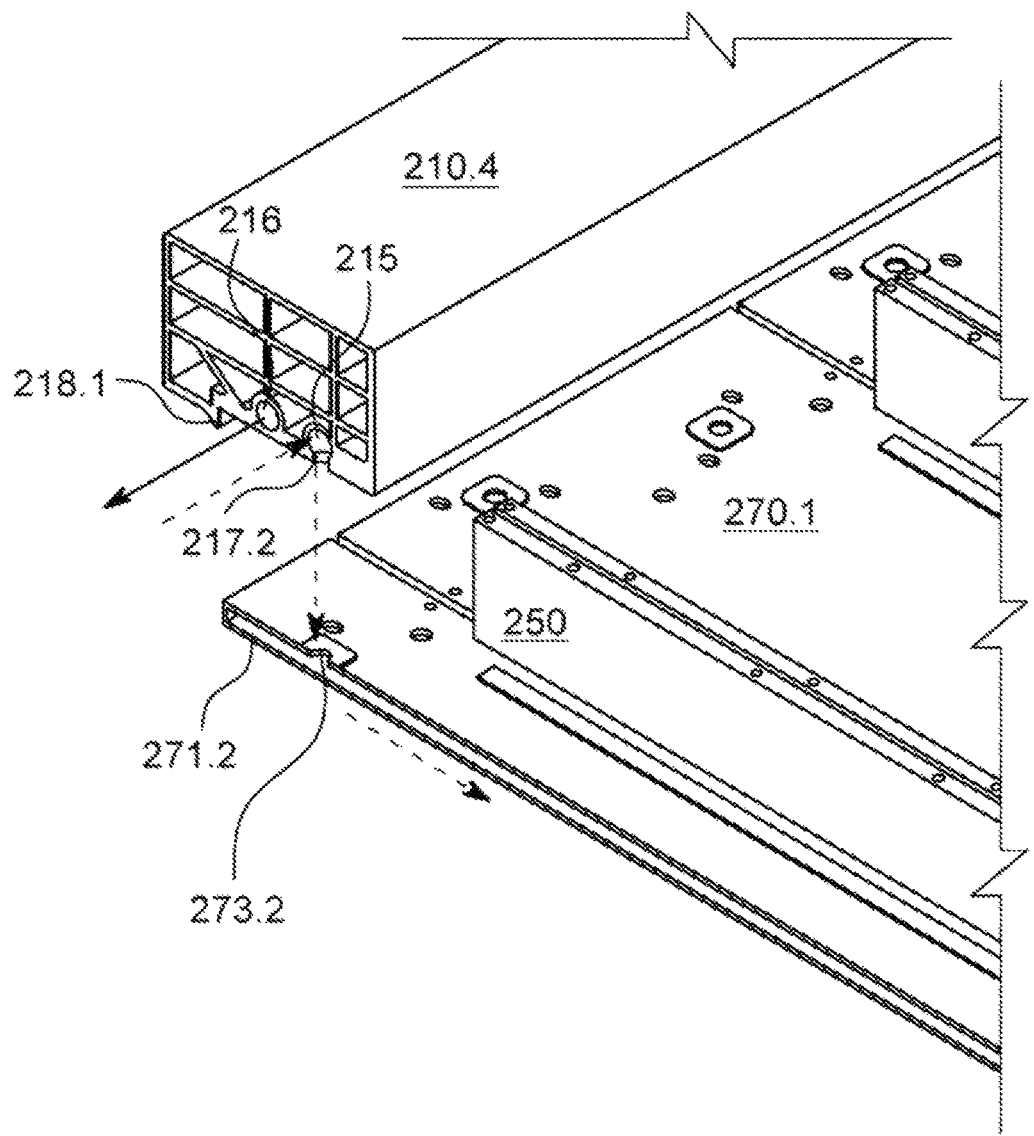
FIG. 14 illustrates an exploded perspective view along line B-B shown in FIG. 11 through the first frame profile.

FIG. 11 is a top view on the framework of FIG. 10. FIG. 12 illustrates a cross-sectional view along line A-A shown in FIG. 10, but restricted to the first frame profile 210.4. FIG. 13 is an exploded perspective view along line C-C illustrating in addition a part of the cooling plate 270.1 and FIG. 14 is another exploded perspective view along line B-B.

As shown in FIG. 12, the first frame profile 210.4 has a basically prismatic shape including an upper side 211 facing the vehicle body structure in final assembly, a lower side 212 facing the cooling plates 270.1, and a pair of longitudinal sides 213, 214. The first frame profile 210.4 includes a first channel 215 and a second channel 216 both being arranged closed to the lower side 212 and extending parallel in longitudinal direction of the frame profile 210.4. The second channel 216 is arranged in a central section of the lower side 212, whereas the first channel 215 is arranged much closer to the longitudinal side 214 facing to the interior space of the framework 200.4.

An arrester element 218.1 is provided at the lower side 212 of the first frame profile 210.4. The arrester element 218.1 is extending in longitudinal direction of the frame profile 210.4. Here, the arrester element 218.1 is positioned closed to the longitudinal side 213 facing away form the interior space of the framework 200.4. As illustrated in FIGS. 13 and 14, the cooling plates 270.1 are resting against the arrester element 218.1 when the cooling plates 270 and the integral coolant structure of the first frame profile 210.4 is in fluid communication.

As shown, the coolant structure is fully embedded into the first frame profile 210.4 and thus forms an integral part thereof. In other words, all constructive elements shown in the cross-sectional views of FIGS. 12 through 13 are made of one single piece of extruded aluminum and especially the parts of the coolant structure are not mounted as single elements to the frame profile 210.4.

FIG. 13 is an exploded perspective view along a part of line C-C of FIG. 11. The second channel 216 is in fluid communication with a connection point 217.1. According to the illustrated embodiment, fluid communication is achieved by a vertical drill-hole extending from the lower side 212 into the second channel 216. On an upper side of the cooling plate 270.1 there is provided a first connection point 273.1 which corresponds in size and position with the connection point 217.1 of the frame profile 210.4.

FIG. 14 is an exploded perspective view along a part of line B-B of FIG. 11. The first channel 215 is in fluid communication with a connection point 217.2. According to the illustrated embodiment, fluid communication is achieved by a vertical drill-hole extending from the lower side 212 into the first channel 215. On the upper side of the cooling plate 270.1 there is provided a second connection point 273.2 which corresponds in size and position with the connection point 217.2 of the frame profile 210.4.

The second frame profile 220.4 may have the very same structure as the first frame profile 210.4, i.e. includes a similar integral coolant structure. Therefore, the coolant plates 270.1 will also have respective first and second connection points 217.1 and 217.2 on the side facing the second frame profile 220.4. The first connection points 217.1 provided at opposite sides of the coolant plate 207.1 are in fluid communication by means of a first coolant passage 271.1. In a similar way, the second connection points 217.2 of the coolant plate 270.1 are in fluid communication by means of a second coolant passage 271.2. The first and second coolant passages 271.1 and 271.2 are separated from each other. Consequently, there are two independent coolant circuits, which may be driven in opposite direction.

Figure 15:
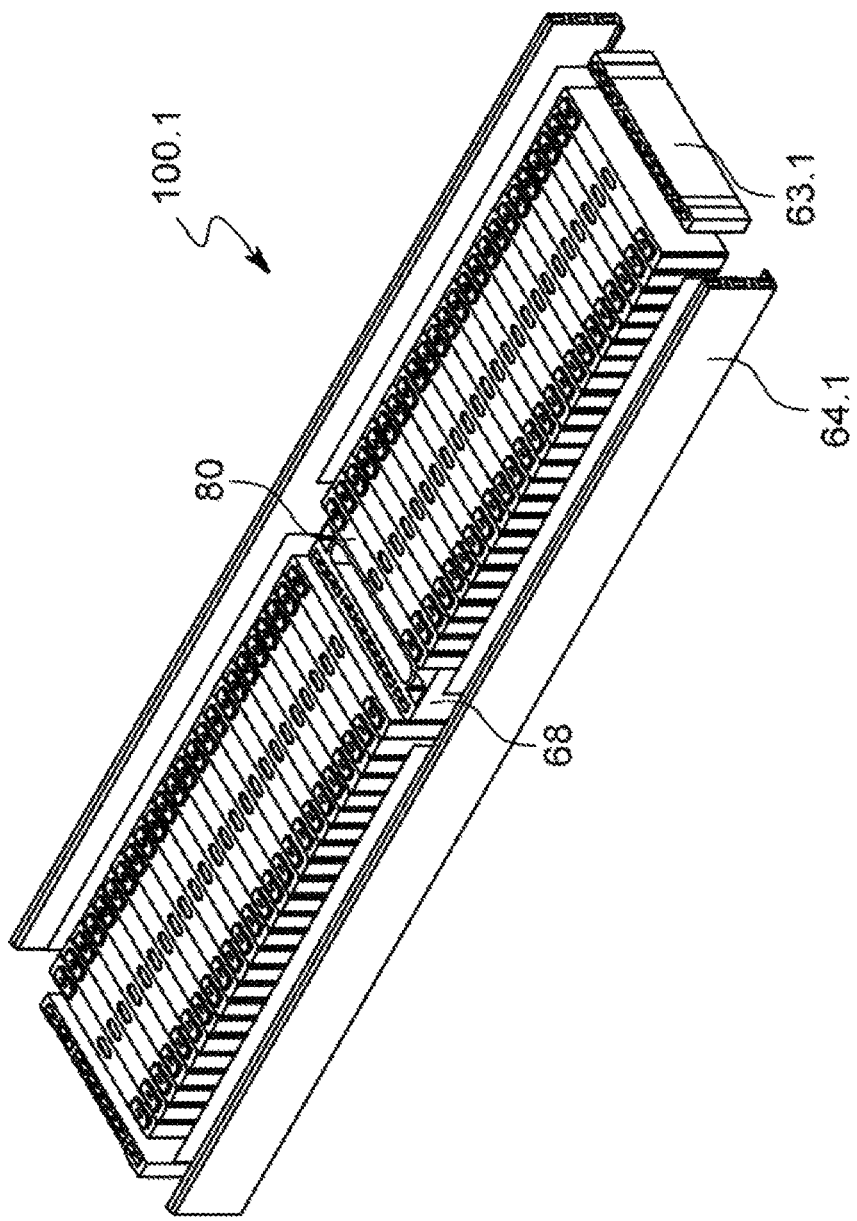
FIG. 15 illustrates an exploded perspective view on a battery module according to another embodiment of the invention.
Figure 16:
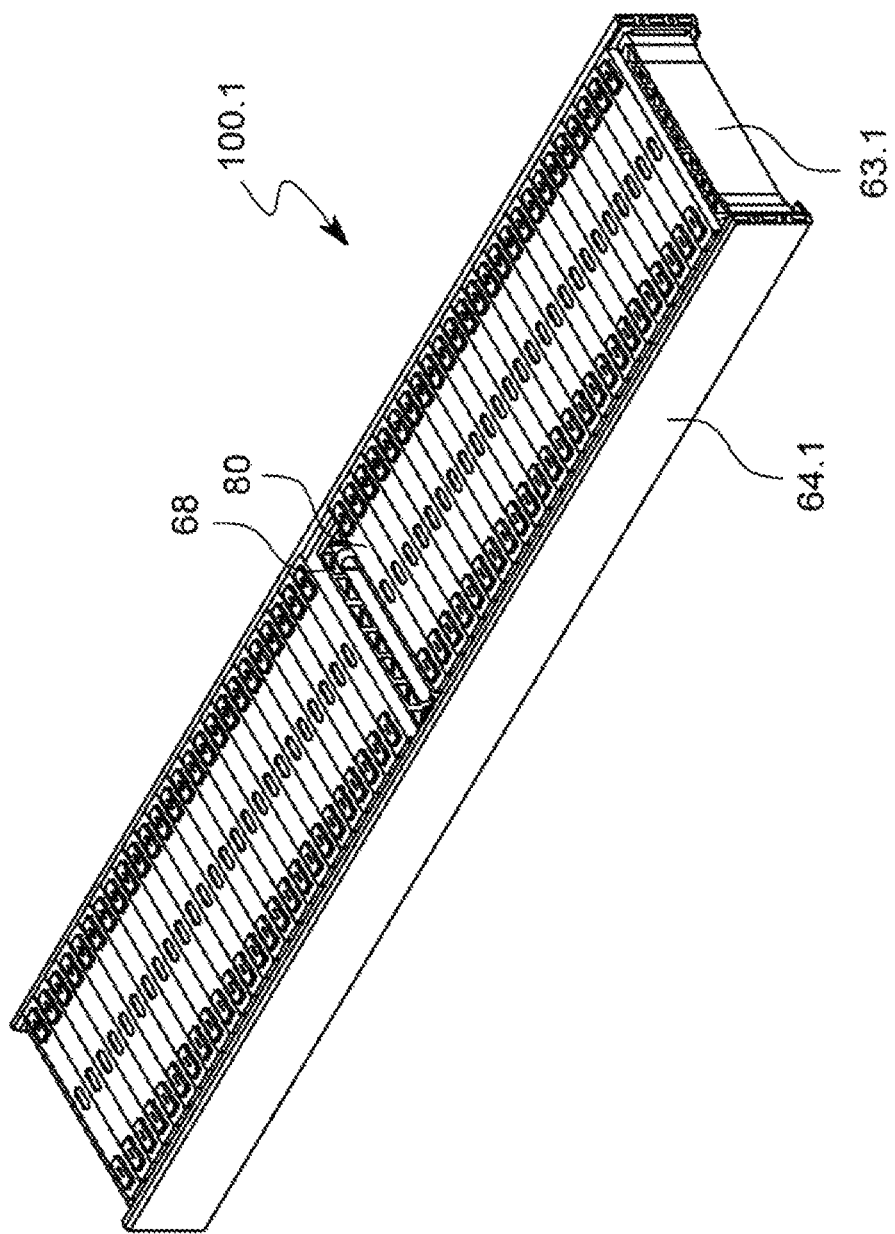
FIG. 16 illustrates an the battery module of FIG. 15 in a mounted stage.

FIGS. 15 and 16 illustrate a battery module 100.1 according to another embodiment of the present invention. The battery module 100.1 basically equals the battery module 100 already described above with respect to FIG. 2. However, the battery module 100.1 includes two stacks of aligned battery cells 80. The cell stacks are encased on four sides by module front plates 63.1 and module side plates 64.1. A middle plate 68 separates both cells stacks from each other and improves fixation of the battery cells 80. The cell stacks are usually compressed to a certain compression force and then fixed via the side plates 64.1. The assembly of module front plates 63.1 and module side plates 64.1 is called the module frame. The joining of the module frame can e.g. be done by welding.

A thermal connection of the module side plates 64.1 to the battery cells 80 can be accomplished with a thermal pad, a thermal gap filler, a thermal glue or by direct contact of the components. In case of a thermal conductive glue or gap filler, the glue or gap filler can also be injected after the module frame is fixed around the cell stacks.

Figure 17:
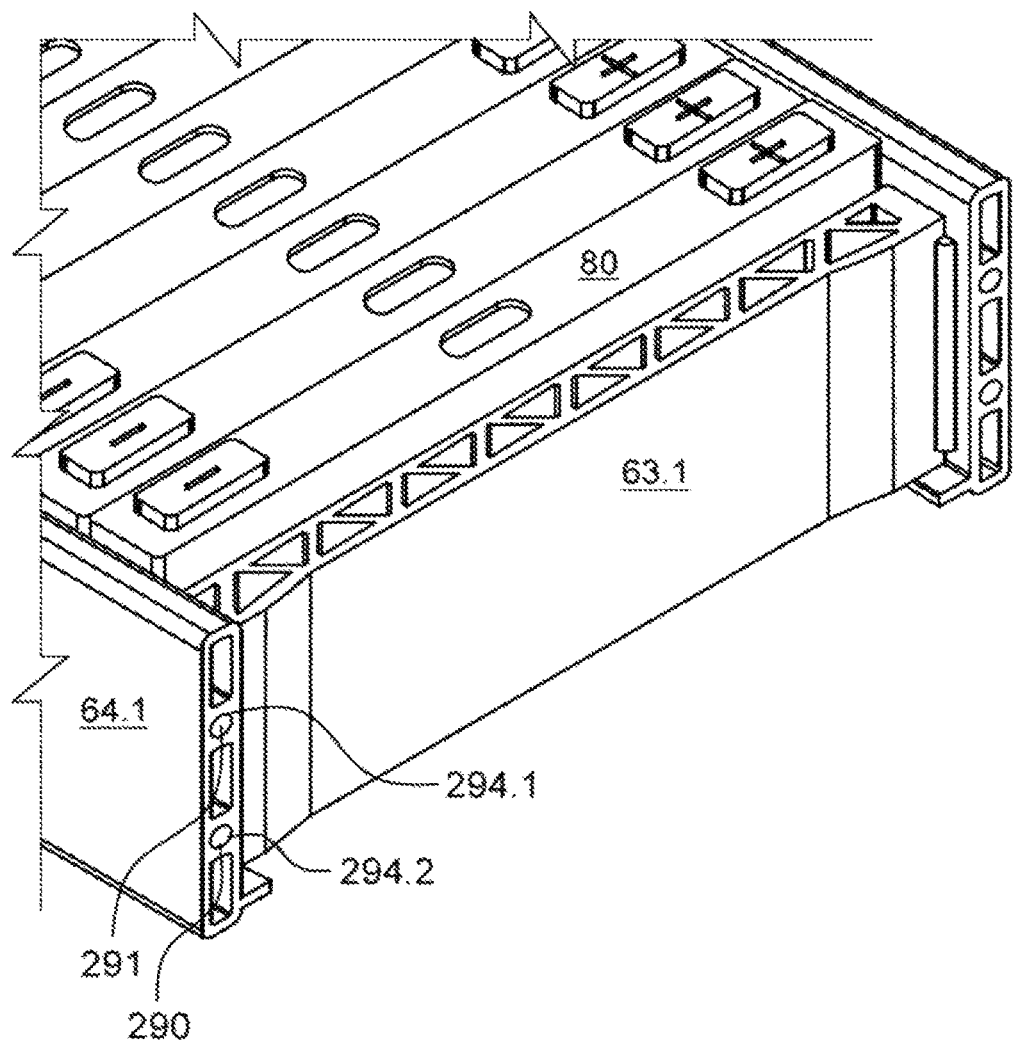
FIG. 17 illustrates an enlarged partially view on one end of the battery module of FIG. 15.

FIG. 17 illustrates an enlarged partially view on one end of the battery module 100.1 of FIG. 15. Both module side plates 64.1 are realized by an aluminum extrusion profile into which a first cooling channel 290 and a second cooling channel 291 are incorporated during the extrusion process. Connection points 294.1 and 294.2 of the first and second cooling channel 290, 291 are provided at the narrow side surface of the module side plates 64.1. Here, the first and second cooling channel 290, 291 extend parallel in longitudinal direction of the module side plate 64.1, i.e. they are at least not in fluid communication within the module side plate 64.1 such that they may be used by separate cooling circuits. Via the cooling channels 290, 291 a cooling liquid, refrigerant or air can flow and thus cool the battery cells 80 from one or two sides of the battery module 100.1. The coolant structure is fully embedded into the module side plates 64.1 and thus forms an integral part thereof. In other words, all constructive elements are made of one single piece of extruded aluminum and especially the parts of the coolant structure are not mounted as single elements to the module side plate 64.1.

Figure 18:
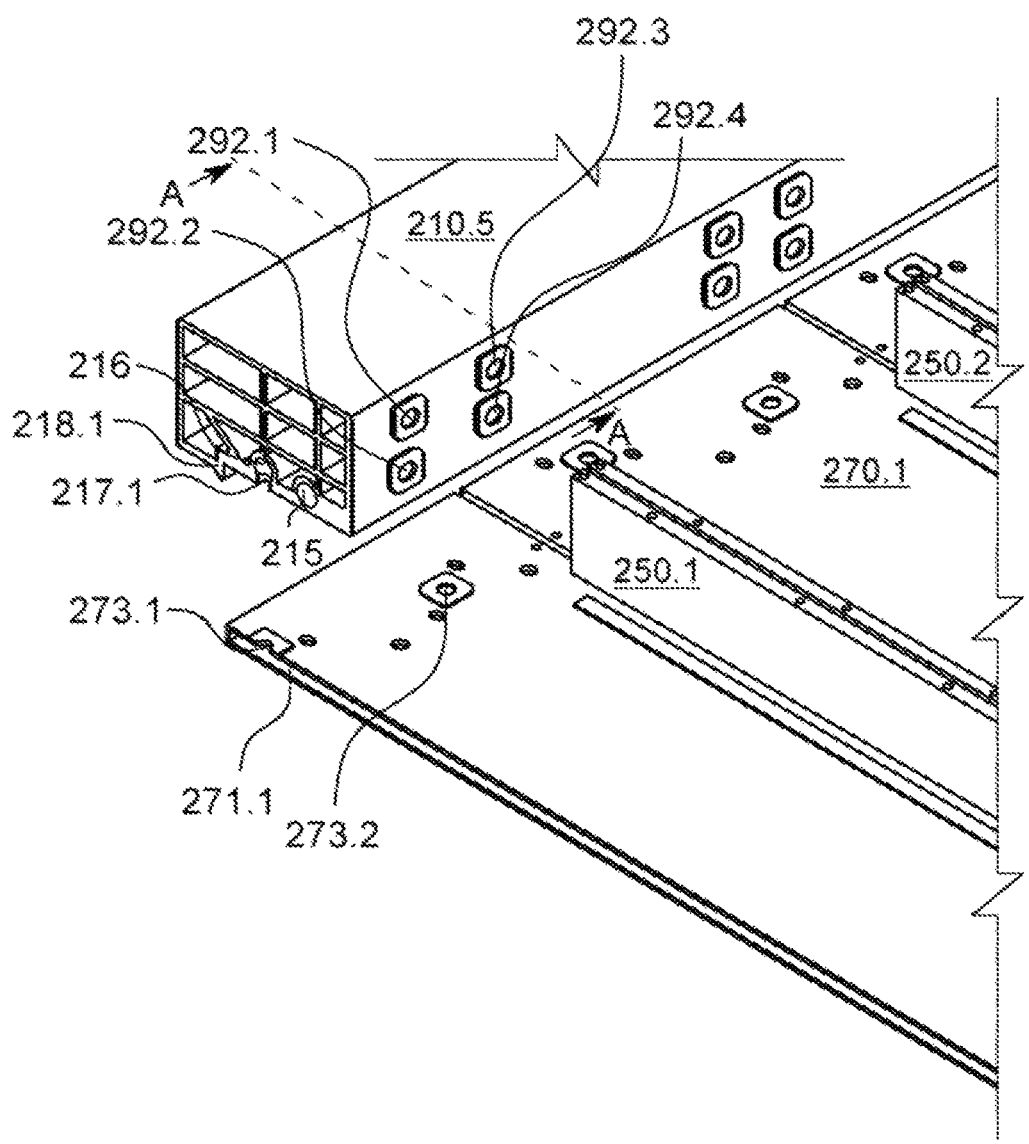
FIG. 18 illustrates an exploded perspective view on a part of a frame including a frame profile of another embodiment of the invention.

FIG. 18 illustrates an exploded perspective view on a part of a frame including a frame profile 210.5 which may be used in combination with the battery module 100.1 described before. The cross-section illustrated in FIG. 18 follows the same line C-C shown in FIG. 11. The frame profile 210.5 is similar to the frame profile 210.4 illustrated in FIG. 13 except that connection points 292.1 to 292.4 are provided at the longitudinal side of the frame profile 210.4 facing inside the frame. These connection points 292.1 to 292.4 can be used for establishing fluid connection to the first and second cooling channel 290, 291 being embedded within the module side plate 64.1 of the battery module 100.1 illustrated in FIGS. 15-17. When the battery module 100.1 is positioned in the frame, lower connection point 294.2 of the first cooling channel 290 lies against lower connection point 292.2 of the frame profile 210.5 and upper connection point 294.1 of the second cooling channel 291 lies against the upper connection point 292.1 of the frame profile 210.5. Tightness of the fluid connection of the module side plate 64.1 and the frame profile 210.5 is ensured by a gasket provided between the corresponding connection points.

The second frame profile 220 (not shown in detail) may have the very same structure as the first frame profile 210.5, i.e. includes a similar integral coolant structure with connection points 292.1 to 292.4 for the module side plates 64.1 at its longitudinal side. Therefore, the module side plate 64.1 will also have respective connection points on the side facing the second frame profile 220.

Figure 19:
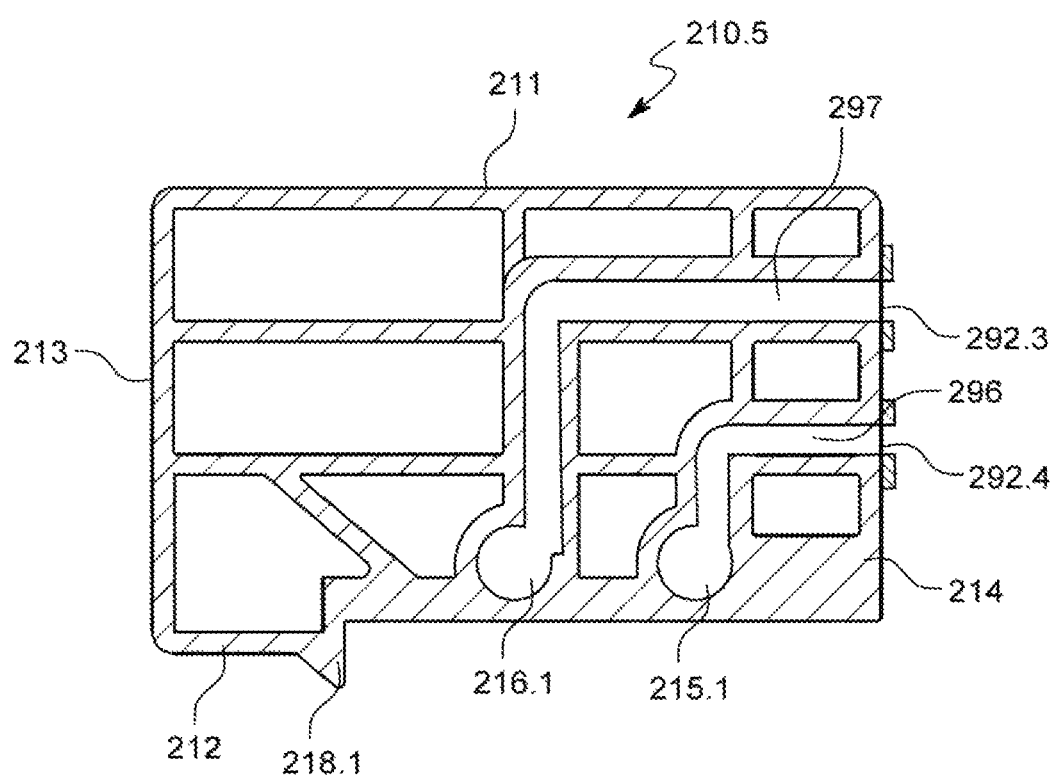
FIG. 19 illustrates a cross-sectional view along line A-A shown in FIG. 18 through the first frame profile.

FIG. 19 illustrates a cross-sectional view along line A-A shown in FIG. 18 through the first frame profile 210.5. Here, the frame profile 210.5 includes a first channel 215.1 and a second channel 216.1 which are not in fluid communication. The cut illustrated is through connection points 292.3 and 292.4 which are provided at the longitudinal side 214 of the frame profile 201.5. Connection point 292.4 joins the first channel 215.1 through duct 296 and connection point 292.3 joins the second channel 216.1 through duct 297. As already described above, connection points 292.4 will lie against connection points 294.2 of the module side plate 64.1 when the battery module 100.1 is placed in the frame thereby establishing fluid communication of the first channel 215.1 of the frame profile 210.5 and the first channel 290 of the module side plate 64.1. In the same manner a fluid connection between the second channel 216.1 of the frame profile 210.5 and the second channel 291 of the module side plate 64.1 is established. In this way two separate cooling circuits may be provided.

Although the invention has been explained in relation to its preferred embodiments as described above, it is to be understood that many other possible modifications and variations can be made without departing from the scope of the present invention. It is, therefore, contemplated that the appended claim or claims will cover such modifications and variations that fall within the scope of the invention.

REFERENCE SIGNS 10 battery pack
21, 22 terminals
60 module top and bottom plates
63, 63.1 module front plate
64, 64.1 module side plate
65, 66 negative and positive module terminals
67 cell connection unit
68 middle plate
69 isolation foil
70 thermal pad
80 battery cell
100, 100.1 battery module
200, 200.1 . . . 200.4 framework
210, 210.2 . . . 210.5 first frame profile
211 upper side of frame profile
212 lower side of frame profile
213, 214 longitudinal sides of frame profile
215, 215.1 first channel
216, 216.1 second channel
217, 217.1, 217.2 connection point at frame profile
218, 218.1 arrester element
220, 220.2 . . . 220.4 second frame profile
221, 222, 223, 224 connection points for vehicle coolant circuit at narrow side of frame profiles
240, 242 frame profiles at narrow sides of framework
250 crossbar
260 section of interior space
270, 270.1 cooling plate
271, 271.1, 271.2 coolant passage
272 upper side of coolant plate
273, 273.1, 273.2 connection point at cooling plate
280 gasket
290 first cooling channel of the module side plate
291 second cooling channel of the module side plate
292.1 . . . 292.4 connection points for the module side plate on the frame profile
294.1, 294.2 connection points for the frame profile on the module side plate
296, 297 ducts
300 vehicle

The invention claimed is:

1. A battery pack for a vehicle, comprising:
one or more battery modules, each comprising:
a plurality of secondary battery cells arranged in a first direction;
a pair of module side plates on opposite sides of the secondary battery cells in a second direction perpendicular to the first direction; and
a pair of module front plates on opposite sides of the secondary battery cells in the first direction
a framework comprising a first frame profile and a second frame profile, both of the first frame profile and the second frame profile extending in the second direction, the second frame profile being opposite to the first frame profile in the first direction with the one or more battery modules therebetween; and
a cooling plate under the one or more battery modules in a third direction perpendicular to the first direction and the second direction and being in thermal contact with the one or more battery modules,
wherein a liquid cooling circuit comprises:
an integral coolant structure in at least one of the module side plates;
an integral coolant structure in each of the first frame profile and the second frame profile; and
an integral coolant structure in the cooling plate.

2. The battery pack for a vehicle of claim 1, wherein the integral coolant structure of the first frame profile comprises a first channel for passage of coolant and extending in a longitudinal direction of the first frame profile, and
wherein the first frame profile has a connection point at where the first channel of the first frame profile is in fluid communication with the integral cooling structure of the cooling plate.

3. The battery pack for a vehicle of claim 2, wherein the integral coolant structure of the first frame profile further comprises a second channel for passage of coolant and extending in the longitudinal direction of the first frame profile, and
wherein the second channel of the first frame profile is in fluid communication with the first channel of the first frame profile via a constituent section.

4. The battery pack for a vehicle of claim 3, wherein the constituent section is positioned at or in a range up to 10 cm from a geometrical mean of the position of the connection point in the longitudinal direction of the first frame profile.

5. The battery pack for a vehicle of claim 1, wherein the integral coolant structure of each of the first and second frame profile comprises:
    a first channel for passage of coolant and extending in a longitudinal direction of the corresponding first and second frame profile;
    a connection point in fluid communication with the corresponding first channel and a respective connection point in the cooling plate;
    a second channel for passage of coolant and extending in the longitudinal direction of the corresponding first and second frame profile and not being in fluid communication with the first channel; and
    a connection point in fluid communication with the corresponding second channel and a respective connection point in the cooling plate.

6. The battery pack for a vehicle of claim 3, wherein
    the connection point is arranged at a lower side of the first frame profile; and
    the cooling plate has a respective connection point arranged at an upper side of the cooling plate, the respective connection point and the connection point being in fluid communication with each other.

7. The battery pack for a vehicle of claim 6, wherein the first frame profile comprises an arrester element at the lower side thereof, and
    wherein the cooling plate rests against the arrester element.

8. The battery pack for a vehicle of claim 1, wherein the integral coolant structure further comprises one or more connection points for connection to a vehicle coolant circuit at a narrow side of the first and second frame profiles.

9. The battery pack for a vehicle of claim 1, wherein the first and second frame profiles are made of aluminum or an aluminum alloy.

10. The battery pack for a vehicle of claim 1, wherein the integral coolant structure of the at least one of the module side plates comprises a first channel for passage of coolant and extending in a longitudinal direction of the at least one of the module side plates, and
    wherein the at least one of the module side plates has connection points at where the first channel thereof is in fluid communication with the integral cooling structure of the first and second frame profiles, respectively.

11. The battery pack for a vehicle of claim 10, wherein the integral coolant structure of the at least one of the module side plates comprises a second channel for passage of coolant and extending in the longitudinal direction of the at least one of the module side plates, and
    wherein the at least one of the module side plates has connection points at where the second channel thereof is in fluid communication with the integral cooling structure of the first and second frame profiles, respectively.

12. The battery pack for a vehicle of claim 11, wherein the integral coolant structure of the first frame profile comprises a first channel and a second channel for passage of coolant and extending in a longitudinal direction of the first frame profile,
    wherein the integral coolant structure of the second frame profile comprises a first channel and a second channel for passage of coolant and extending in a longitudinal direction of the second frame profile,
    wherein the first channel of the at least one of the module side plates is in fluid communication with the first channel of the first frame profile and the first channel of the second frame profile, and
    wherein the second channel of the at least one of the module side plates is in fluid communication with the second channel of the first frame profile and the second channel of the second frame profile.

13. The battery pack for a vehicle of claim 1, wherein the module side plates are made of the same material as the first and second frame profiles.

14. A vehicle comprising the battery pack according to claim 1.

15. The battery pack for a vehicle of claim 1, wherein the framework further comprises a third frame profile and a fourth frame profile, both of the third frame profile and the fourth frame profile extending in the first direction, the fourth frame profile being opposite to the third frame profile in the second direction with the one or more battery modules therebetween,
    wherein the first, second, third, and fourth frame profiles together have a rectangular shape and are made of a metal.

* * * * *